W. J. BERGENS.
MIXING VALVE.
APPLICATION FILED MAY 13, 1912.
1,061,724. Patented May 13, 1913.
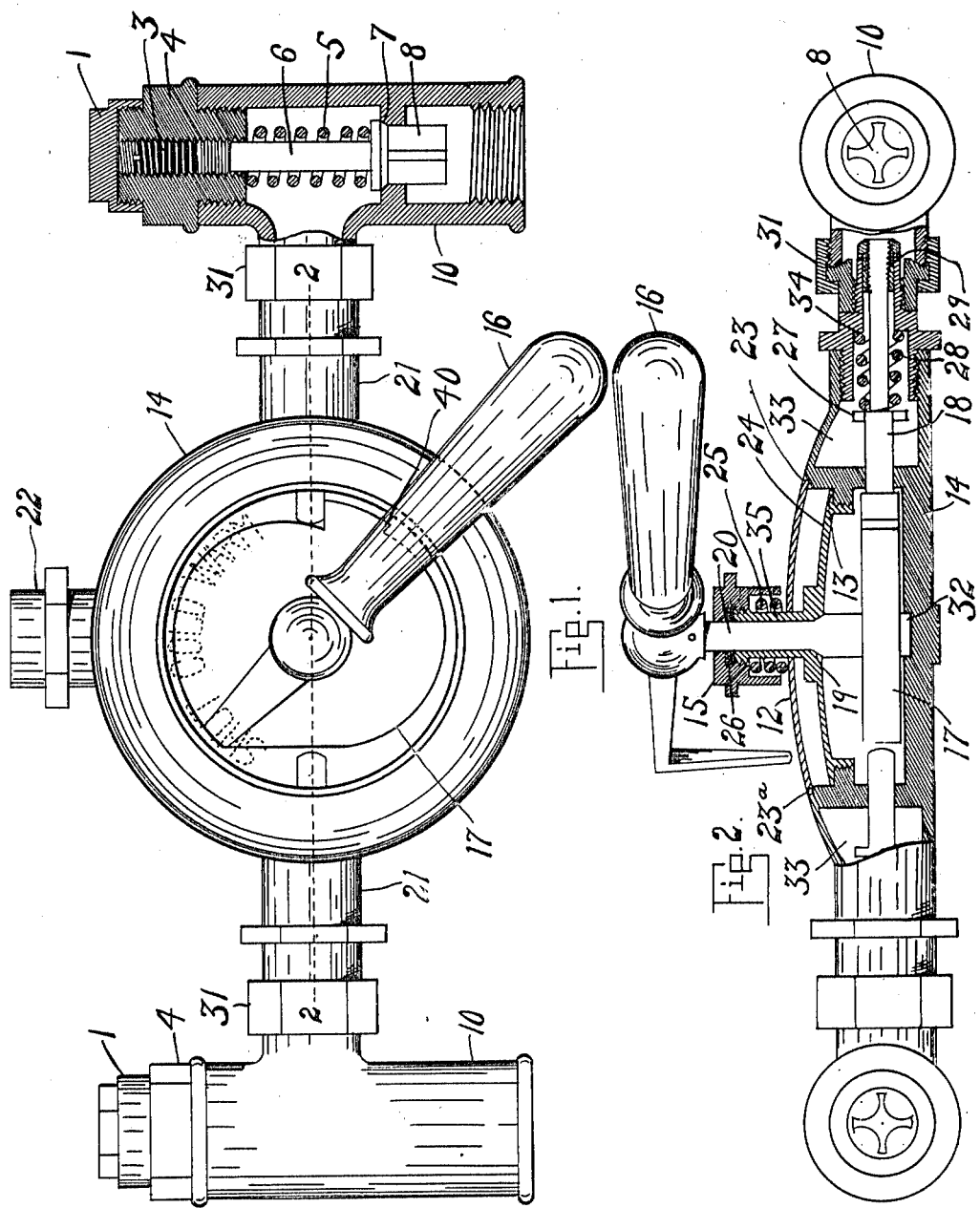
Witnesses
H. L. Richey
C. L. Terry
Inventor
William J. Bergens
By John A. Bommhardt
Attorney ns.
UNITED STATES PATENT OFFICE.

WILLIAM J. BERGENS, OF CLEVELAND, OHIO, ASSIGNOR OF ONE-FOURTH TO CARLETON L. TERRY AND ONE-FOURTH TO JOHN A. BOMMHARDT, BOTH OF CLEVELAND, OHIO, AND ONE-HALF TO THE SINGLE FAUCET COMPANY, OF CHICAGO, ILLINOIS, A CORPORATION OF ILLINOIS.

MIXING-VALVE.

1,061,724.     Specification of Letters Patent.     Patented May 13, 1913.

Application filed May 13, 1912. Serial No. 697,047.

*To all whom it may concern:*

Be it known that I, WILLIAM J. BERGENS, a citizen of the United States, residing at Cleveland, in the county of Cuyahoga and State of Ohio, have invented certain new and useful Improvements in Mixing-Valves, of which the following is a specification.

This invention relates to compound valves, and especially to mixing valves used in connection with shower and other baths.

The object of the invention is to provide improved means for preventing scalding, by a construction which will prevent the delivery of hot water alone, and also by means of which the proportion of hot water may be limited under all conditions.

A further object of the invention is to provide an improved construction with respect to the index plate, whereby it may be easily changed according to local circumstances.

A further object of the invention is to improve the details of a mixing valve in the particulars more fully indicated in the following specification.

In the drawings—Figure 1 is a plan view of the valve, parts being removed to show the cam. Fig. 2 is a section on the line 2—2 of Fig. 1.

Referring specifically to the drawings, 14 indicates the central casing forming a chamber which contains the cam 17. This chamber is separated by the side wall of the casing from a cored passage 33 which communicates at its opposite ends with the hot and cold water inlet pipes 21, and intermediately with the outlet pipe 22. The cam 17 is mounted on a spindle 20 which has a bearing at 32 in the bottom of the casing, and at its outer end carries a handle 16 whereby it may be turned. The cam chamber is closed at the top by a bonnet 24 screwed against a shoulder 13 on the wall of the casing, and the spindle 20 has a tapered shoulder at 19 against which the bonnet 24 rests to hold the spindle in position.

12 is an index plate shaped to fit in a recess or rabbet 23 in the top of the casing, and this index plate has a hole through which the sleeve or neck 35 of the bonnet 24 extends. A nut 15 is screwed on this neck, above the index plate, and is provided with packing 26, and the inner end of the nut is counterbored to form a seat for the coiled spring 25 which presses on the index plate 12 and holds the same in position irrespective of the position of the stuffing nut 15, so that the plate is held to its place without looseness. Keys 23ª may be inserted to prevent turn or shift of the index plate, which is provided with marks corresponding to the shape of the cam. The pipes 21 inclose the stems 18 of the inlet valves the inner ends of which work through openings in the wall of the casing 14, to contact with the cam 17. Projections 27 and 29 on the valve stems serve to guide the valves, and springs 28 are interposed between said projections 27 and shoulders 34 for the purpose of assisting the closure of the valves. By means of couplings 31 the pipes 21 are joined to T fittings 10 containing check valves 8 each of which closes against a seat 7, under the pressure of a coiled spring 5.

4 is a screw plug having a threaded bore which receives a screw plug 3 which acts as a stop to limit the rise of the check valve 8, the stem 6 of the check valve working in the bore of the plug 4 and adapted to strike the stop 3. A cap 1 is screwed onto the plug 4.

The check valves serve two purposes: One is to prevent internal circulation in consequence of the difference in pressure of the hot and cold water, and the other is to permit adjustment to regulate the proportion of hot water admitted. When the hot water supply is maintained at a high temperature the stop 3 may be screwed in to permit only a small opening of the check valve on the hot water inlet side, so that by no possibility can the temperature of the fluid served become sufficiently hot to scald.

The shape of the cam 17 is such that the cold water valve (indicated on the right in the drawing) is opened first, and as the cam is turned this is followed by the opening of the hot water valve; and the cold water valve is maintained in open position during all positions of the cam, since the cam is provided with a stop 40 which strikes the hot water valve stem at the limit of movement so that the cam cannot be turned to bring the cold water valve stem beyond the high point of the cam. By varying the shape of the cam the proportions can be varied and therefore the index plate 12 is made easily removable so that another can be substituted, for example in case it should be desired to deliver cold, warm or hot water.

What I claim as new is:

1. In a mixing valve, the combination with a valve casing, a valve-operating device including a spindle extending into the casing, a bonnet on the casing, an index plate mounted on the casing, an outer packing nut surrounding the spindle, a connecting sleeve between the packing nut and the bonnet, said sleeve extending around the spindle and through the index plate, and means engaged by the packing nut to confine the index plate to the casing.

2. In a mixing valve, the combination of a casing, a bonnet thereon having a sleeve projecting outwardly, valve operating devices located in the casing and including a spindle extending through said sleeve, an index plate mounted on the casing and surrounding said sleeve, a packing nut screwed on the sleeve around the spindle, and a spring between the packing nut and the index plate.

3. In a mixing valve the combination of a valve casing having a central chamber, a bonnet screwed into the casing and forming the top of said chamber and having an outwardly projecting sleeve, valve operating devices located in the chamber and including a spindle extending through said sleeve and retained by the bonnet, a packing nut around the spindle on the outer end of the sleeve, and an index plate confined between the nut and the bonnet.

In testimony whereof, I do affix my signature in presence of two witnesses.

WILLIAM J. BERGENS.

Witnesses:
JOHN A. BOMMHARDT,
STEDMAN J. ROCKWELL.